United States Patent [19]

Yokota et al.

[11] Patent Number: 4,687,388
[45] Date of Patent: Aug. 18, 1987

[54] DRILL BIT

[75] Inventors: Yuzo Yokota; Atsushi Endo, both of Kanagawa, Japan

[73] Assignee: Toshiba Tungaloy Co., Ltd., Japan

[21] Appl. No.: 866,076

[22] Filed: May 22, 1986

[30] Foreign Application Priority Data

May 24, 1985 [JP] Japan .................................. 60-111396

[51] Int. Cl.[4] .............................................. B23B 51/02
[52] U.S. Cl. ....................................... 408/230; 408/227
[58] Field of Search ............... 408/204, 205, 207, 227, 408/224, 230

[56] References Cited

U.S. PATENT DOCUMENTS

| 2,847,885 | 8/1958 | Wagner | 408/204 |
|---|---|---|---|
| 3,966,349 | 6/1976 | Osman et al. | 408/204 |
| 4,149,821 | 4/1979 | Faber | 408/204 |
| 4,322,187 | 3/1982 | Hougen | 408/204 |
| 4,373,839 | 2/1983 | Negishi et al. | 408/205 |

FOREIGN PATENT DOCUMENTS

| 244711 | 1/1966 | Austria | 408/224 |
|---|---|---|---|
| 3319718 | 12/1984 | Fed. Rep. of Germany | 408/204 |
| 980967 | 12/1982 | U.S.S.R. | 408/207 |

Primary Examiner—Gil Weidenfeld
Assistant Examiner—Daniel W. Howell
Attorney, Agent, or Firm—Saidman, Sterne, Kessler & Goldstein

[57] ABSTRACT

A drill bit is provided with a pair of cutting edges which are positioned so that a narrow slot is formed therebetween in an area including the rotational axis of the drill bit and so that the lines joining the rotational axis of the drill bit and the innermost points of the respective cutting edges are at an angle not larger than about 160° with each other as viewed in the axial direction of the drill bit.

6 Claims, 9 Drawing Figures

DRILL BIT

BACKGROUND OF THE INVENTION

1. Field of the Invention

This invention relates to a drill bit, and more particularly to a drill bit having a pair of cutting edges spaced from each other with the rotational axis of the drill bit intervening therebetween.

2. Description of the Prior Art

In U.S. Pat. No. 4,373,839 (Negishi et al.), there is disclosed a drill bit having a pair of cutting edges which are opposed to each other with the rotational axis of the drill bit intervening therebetween. That is, a slot or a non-cutting portion which does not serve for cutting is formed between the cutting edges at a portion including the rotational axis of the drill bit. The portions of the respective cutting edges nearest to the rotational axis are symmetrically disposed with respect to the rotational axis of the drill bit. That is, the portions of the respective cutting edges nearest to the rotational axis of the drill bit (Each of these portions will be referred to as "the innermost point of the cutting edge" in this specification.) are diametrically opposed to each other (In other words, the innermost points of the cutting edges are on a line passing through the rotational axis of the drill bit as viewed in the axial direction of the drill bit.) and are equally spaced from the rotational axis by a predetermined distance which is generally from 0.1 mm to 1.25 mm.

The U.S. patent identified above says that the slot between the cutting edges serves to reduce the thrust load acting on the drill bit during drilling operation, to prevent melt-adhesion of cuttings to the cutting edge and to prevent shaking of the drill bit. Further it is said that, though a cylindrical core (residual part of the workpiece) is first formed on the bottom of the hole being drilled by virtue of the slot between the cutting edges, the core is twisted off during the drilling operation before it grows to an unacceptable height since the width of the slot is so defined.

However, according to our investigation, the drill bit is unsatisfactory in that cuttings and/or the twisted-off core are apt to clog the slot between the cutting edges to adversely affect the drilling operation or to break the cutting edge.

SUMMARY OF THE INVENTION

In view of the foregoing observations and description, the primary object of the present invention is to provide a drill bit in which the thrust load acting on the drill bit during drilling operation is reduced, melt-adhesion of cuttings to the cutting edge is prevented and shaking of the drill bit during drilling operation is restricted, and in which cuttings and/or twisted-off cores can be smoothly discharged so as not to adversely affect the drilling operation or not to cause damage to the cutting edge.

The drill bit of the present invention is characterized by having a pair of cutting edges which are positioned so that a narrow slot is formed therebetween in an area including the rotational axis of the drill bit and so that the lines joining the rotational axis of the drill bit and the innermost points of the respective cutting edges are at an angle not larger than about 160° with each other as viewed in the axial direction of the drill bit. In other words, the innermost points of the cutting edges are not diametrically opposed to each other, as is the case in the prior art drill bit.

The drill bit of the present invention is not for drilling a hole having a central core but for drilling a hole without a central core. That is, the width of the narrow slot is selected so that the core once formed in the slot during a drilling operation is subsequently broken in the drilling operation, and is generally 0.2 to 2.5 mm.

DETAILED DESCRIPTION OF THE INVENTION

Figure 1:
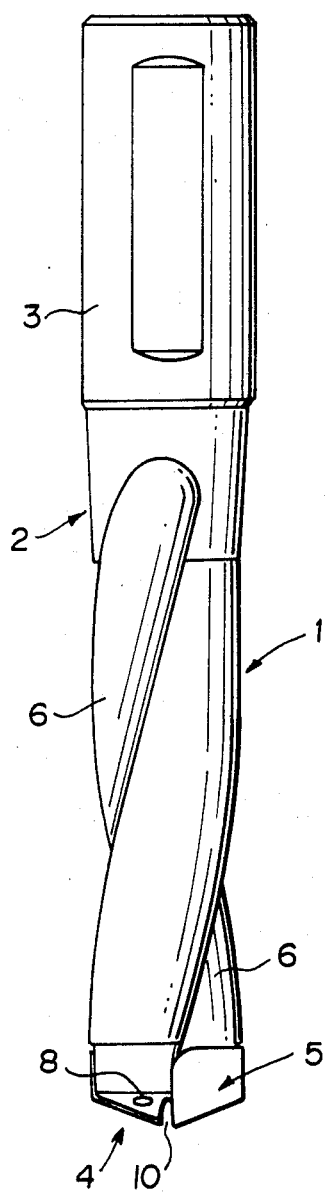
FIG. 1 is a schematic side view of a twist drill to which the present invention is applicable.
Figure 2:
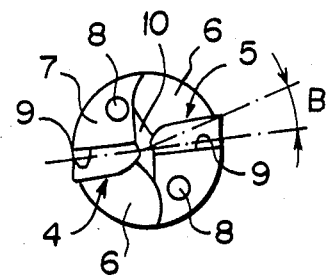
FIG. 2 is a bottom view of the drill.
Figure 3:
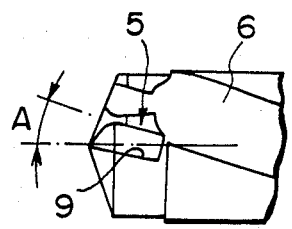
FIG. 3 is a fragmentary side view of the drill.

In FIGS. 1 to 3, a twist drill 1 to which the present invention is applicable comprises a drill body 2 and a shank 3. The drill body 2 has first and second cutting edges 4 and 5 on the front end face thereof, and a pair of twisted grooves 6 on the side face thereof. The drill body 2 is provided with a pair of oil holes 8 opening to a heel portion 7 thereof for supplying machining oil. The cutting edges 4 and 5 formed by fixing a pair of cutting edge pieces of super hard alloy in tip seats 9 by brazing. The cutting edges 4 and 5 have axial rake angles A conforming to the angle of twist of the twisted grooves 6. The radial rake angles B of the cutting edges 4 and 5 are negative. For example, the axial rake angle A is 18° and the radial rake angle B is −18°.

The cutting edges 4 and 5 are spaced from each other with the rotational axis of the drill body 2 intervening therebetween, and a slot 10 is formed between the cutting edges 4 and 5.

The most important feature of the drill bit in accordance with the present invention lies in the relative position of the innermost points of the cutting edges 4 and 5 on opposite sides of the slot 10. This feature will be described in detail, hereinbelow, in comparison with the drill bit in accordance with the prior art in which the innermost points of the cutting edges are symmetrically disposed with respect to the rotational axis of the drill bit.

Figure 4A:
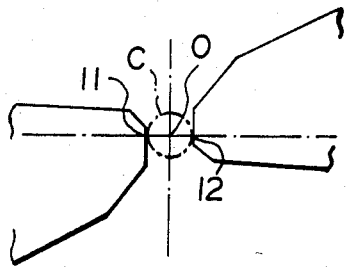
FIG. 4A is an enlarged schematic view showing the relative position between the cutting edges used in the drill in accordance with the prior art.
Figure 4B:
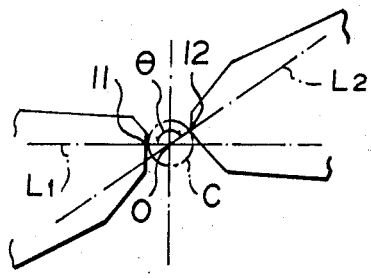
FIG. 4B is a view similar to FIG. 4A but showing the relative position between the cutting edges used in a drill in accordance with an embodiment of the present invention.
Figure 4C:
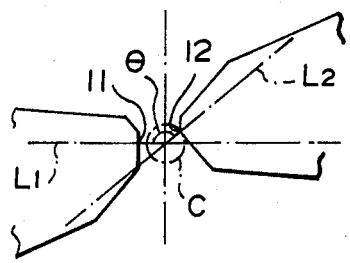
FIG. 4C is a view similar to FIG. 4B but showing the relative position between the cutting edges used in a drill in accordance with another embodiment of the present invention.

In the prior art drill bit, the first and second cutting edges 4 and 5 are disposed symmetrically with respect to the rotational axis O of the drill body 2 as shown in FIG. 4A. That is, the innermost point 11 of the first cutting edge 4 and the innermost point 12 of the second cutting edge 5 are equally spaced from the rotational axis O of the drill body 2 and are diametrically opposed to each other, i.e., positioned on a line passing through the rotational axis O as viewed in the axial direction of the drill body 2. On the other hand, in the drill bit in accordance with the present invention, the innermost points 11 and 12 are not diametrically opposed to each other as shown in FIGS. 4B and 4C, for example. In other words, the line $L_1$ joining the rotational axis O of the drill body 2 and the innermost point 11 of the first cutting edge 4 and the line $L_2$ joining the rotational axis O of the drill body 2 and the innermost point 12 of the second cutting edge 5 are at an angle $\theta$. Typically, the condition shown in FIG. 4B or 4C can be obtained by chamfering at least one of the cutting edges 4 and 5. In the case of the cutting edges shown in FIG. 4B, the distance between the rotational axis O and the innermost point of the cutting edge is larger in the chamfered cutting edge than in the cutting edge which is not chamfered, and in the case of cutting edges shown in FIG. 4C, the reverse is the case. However, the two distances may be equal to each other. The most important feature of the present invention does not lie in the distances between the innermost points and the rotational axis O but lies in the fact that the lines $L_1$ and $L_2$ are at an angle the value of which will be discussed later. In FIGS. 4A to 4C, circle C represents the portion of material-to-be-drilled which, theoretically, is not cut by the cutting edges and once remains as a core. Theoretically, the diameter of the circle C or the core to be formed during drilling operation is determined by the distance between the rotational axis O and one of the innermost points 11 and 12 nearer to the rotational axis O though it is not actually true as will be discussed in more detail later. In the prior art drill bit, the distance between the innermost points 11 and 12 are selected to be 0.2 to 2.5 mm as described above.

The present invention is based on a discovery that, in the case of the drill bit in which the innermost points 11 and 12 are not diametrically opposed to each other, clogging of the slot 10 with the core occurs less frequently than in the case of the drill bit in which the innermost points 11 and 12 are diametrically opposed to each other. Now, the result of our experiments which led to the present invention will be described, hereinbelow.

EXAMPLE 1

Figure 5A:
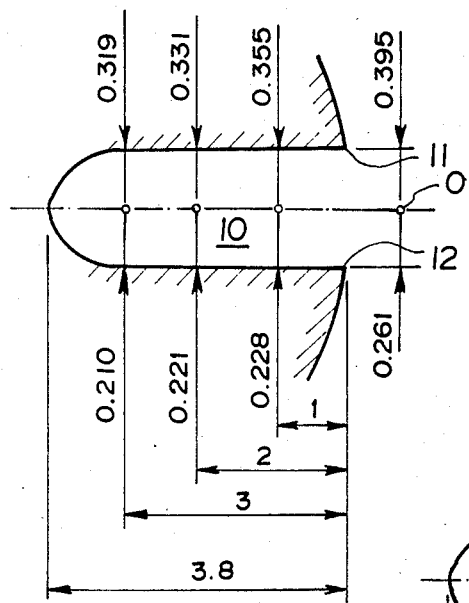
FIG. 5A is a schematic cross-sectional view showing the dimensions of a part of the prior art drill bit used in example 1.
Figure 5B:
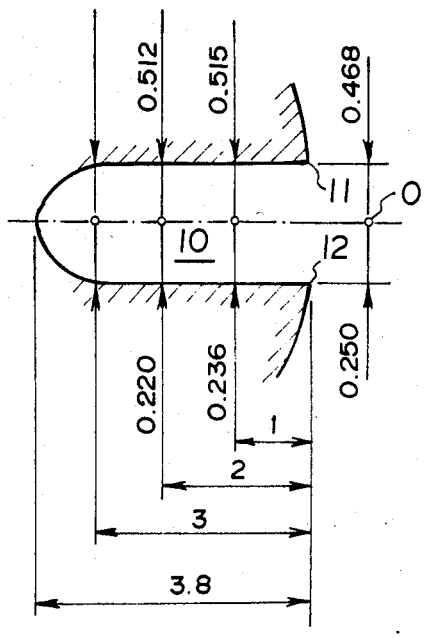
FIG. 5B is a view similar to FIG. 5A but showing the dimensions of the corresponding part of the drill bit in accordance with the present invention used in example 1.

A drill bit in accordance with the prior art and a drill bit in accordance with the present invention were prepared. Both the drill bits were of a type shown in FIG. 1 (honing: 0.03 mm× −25° in the case of the former bit, 0.15 −0.2 mm× −25° in the case of the latter bit). The former drill bit had a pair of cutting edges 4 and 5 which were substantially as shown in FIG. 4A in shape as viewed in the axial direction thereof, and the dimensions of the slot 10 between the cutting edges 4 and 5 were as shown in FIG. 5A. In the former drill bit, the innermost points 11 and 12 were diametrically opposed. According to the dimensions shown in FIG. 5A, the cutting edges 4 and 5 are not symmetrical in the strict sense since the distance between the innermost point 11 of the first cutting edge 4 and the rotational axis O and the distance between the innermost point 12 of the second cutting edge 5 and the rotational axial O differ from each other. However, the difference is within the range of inevitable manufacturing error, and it should be considered that the cutting edges 4 and 5 are disposed symmetrically with respect to the rotational axis O. The latter drill bit or the drill bit in accordance with the present invention had a pair of cutting edges 4 and 5 which were substantially as shown in FIG. 4B in shape as viewed in the axial direction thereof, and the dimensions of the slot 10 between the cutting edges 4 and 5 were as shown in FIG. 5B. In the latter drill bit, the innermost points 11 and 12 of the cutting edges 4 and 5 were not diametrically opposed to each other, that is, the line $L_1$ joining the innermost point 11 of the first cutting edge 4 and the line $L_2$ joining the innermost point 12 of the second cutting edge 5 were not aligned with each other, but were at about 147.6° (i.e., the angle $\theta$ in FIG. 4B was about 147.6°). Both the drill bits were 24.8 mm in diameter. No. 1 to No. 11 holes, each having a depth of 1.3 mm, were drilled with said former drill bit while the feed rate f (mm/rev) was changed in a predetermined manner, and No. 12 to No. 24 holes, each having a depth of 1.3 mm, were drilled with said latter drill bit while the feed rate f was changed in the same manner, and clogging of the slot 10 with the core was detected. Example 1 was conducted under the following conditions, and the result was shown in Table I.

machine: vertical machining center (16Kw) Toshiba Kikai
material to be drilled: S55C $H_B230$ 250×180×40t
machining oil: emulsion HDE 50(×10) Yushiro ... 8 lit./min.
oil feed holder: BT50—$\phi$32—side lock Kuroda coolant feeder
rpm: 500 rpm constant

TABLE I

| hole No. | f(mm/rev) | clogging (D ... detected, N ... not detected) |
| --- | --- | --- |
| Prior art drill bit | | |
| #1 | 0.20 | D |
| #2 | 0.03 | D |
| #3 | 0.20 | D |
| #4 | 0.03 | N |
| #5 | 0.15 | D |
| #6 | 0.03 | N |
| #7 | 0.20 | D |
| #8 | 0.03 | D |
| #9 | 0.03 | D |
| #10 | 0.10 | D |
| #11 | 0.03 | D |
| Present invention drill bit | | |
| #12 | 0.20 | N |
| #13 | 0.03 | N |
| #14 | 0.20 | N |
| #15 | 0.03 | N |
| #16 | 0.15 | N |
| #17 | 0.03 | N |
| #18 | 0.20 | N |
| #19 | 0.03 | N |
| #20 | 0.03 | N |
| #21 | 0.10 | N |
| #22 | 0.03 | N |

This result clearly shows that clogging of the core or cuttings in the slot less frequently occurs in the drill bit of the present invention than in the prior art drill bit, or the clogging does not occur in the drill bit of the present invention.

EXAMPLE 2

Figure 6:
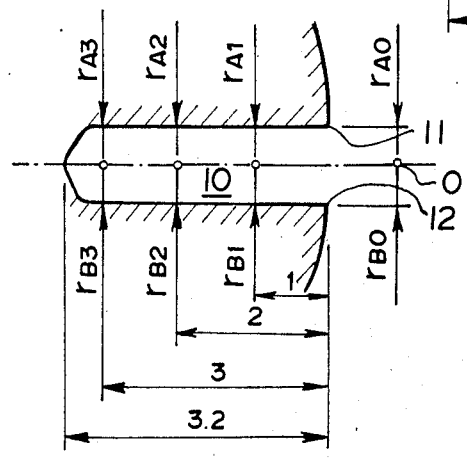
FIG. 6 shows the dimensions of the drill bits used in example 2.

Four types of drill bits (drill bit A to drill bit D) were prepared. The drill bits A to D were all of a type shown in FIG. 1 (honing: 0.03 mm× −25° in the case of the bit A, 0.15−0.2 mm× −25° in the case of the other bits). The drill bit A had a pair of cutting edges 4 and 5 which were substantially as shown in FIG. 4A in shape as viewed in the axial direction thereof, and the dimensions of the slot 10 between the cutting edges 4 and 5 were as shown in FIG. 6. In the drill bit A, the innermost points 11 and 12 were diametrically opposed. The other drill bits had a pair of cutting edges 4 and 5 which were substantially as shown in FIG. 4C in shape as viewed in the axial direction thereof, and the dimensions of the slot 10 between the cutting edges 4 and 5 were as shown in FIG. 6. The dimensions indicated at symbols in FIG. 6 are as follows.

|  | bit A | bit B | bit C | bit D |
|---|---|---|---|---|
| $r_{A0}$ | 0.365 | 0.360 | 0.353 | 0.360 |
| $r_{B0}$ | 0.284 | 0.296 | 0.318 | 0.361 |
| $r_{A1}$ | 0.335 | 0.328 | 0.329 | 0.336 |
| $r_{B1}$ | 0.244 | 0.256 | 0.298 | 0.319 |
| $r_{A2}$ | 0.305 | 0.293 | 0.305 | 0.317 |
| $r_{B2}$ | 0.226 | 0.238 | 0.266 | 0.267 |
| $r_{A3}$ | 0.298 | 0.282 | 0.285 | 0.301 |
| $r_{B2}$ | 0.228 | 0.236 | 0.233 | 0.234 |

In the drill bits other than the drill bit A, the innermost points 11 and 12 of the cutting edges 4 and 5 were not diametrically opposed to each other, that is, the line $L_1$ joining the innermost point 11 of the first cutting edge 4 and the line $L_2$ joining the innermost point 12 of the second cutting edge 5 were not aligned with each other, but were at about 163.6°, 153.3° and 141.9°, respectively. That is, the angles $\theta$ were respectively 163.6°, 153.3° and 141.9°. All the drill bits were 24.8 mm in diameter. Numbers of holes, each having a depth of 2 mm, were drilled with the drill bits A to D at a fixed feed rate f (0.3 mm/rev) and clogging of the slot 10 with the core was detected. Example 2 was conducted under the following conditions, and the result was shown in Table II.

machine: vertical machining center (11Kw) Toshiba Kikai
material to be drilled: S55C $H_B$250-270 250×180×40t
machining oil: emulsion HDE 50(×10) Yushiro 8 lit./min.(internal oil feed)
oil feed holder: BT50—φ32—side lock Kuroda coolant feeder
rpm: 500 rpm constant

TABLE II

| drill bit | number of cloggings/number of drilled holes |
|---|---|
| bit A ($\theta$ = 180°) | 10/10 |
| bit B ($\theta$ = 163.6°) | 7/10 |
| bit C ($\theta$ = 153.3°) | 2/10 |
| bit D ($\theta$ = 141.9°) | 2/10 |

It had been found before example 2 was conducted that clogging of the core in the slot was more apt to occur when 2 mm deep holes were drilled with the prior art drill bit at a feed rate of 0.3 mm/rev. In view of this fact the drill bit B having the angle $\theta$ of about 163.6° may be considered to be on the boundary between the acceptable and the unacceptable. Accordingly, in accordance with the present invention, the angle $\theta$ should be not larger than about 160° though preferably the angle $\theta$ should be not larger than 153°.

The cause of the result of the present invention is not obvious but seems to be as follows.

As described above, the diameter of the core theoretically should be determined by the distance between the rotational axis O of the drill bit and one of the innermost points 11 and 12 which is nearer to the rotational axis O than the other and accordingly, the core could not be retained in the slot 10 since the diameter of the core should be smaller than the width of the slot 10 in either of the prior art drill bit or the drill bit in accordance with the present invention. However, actually the core is retained in the slot 10 or clogs the slot 10 in the case of the prior art drill bit as reported in tables I and II. Our experiments revealed an unexpected fact that the diameter of the core formed by drilling with a drill bit having a slot between a pair of cutting edges was larger than the width of the slot. This tendency was more remarkable in the drill bit of the present invention than in the prior art drill bit. This fact seems to suggest the following mechanism.

Cuttings are cut out from the material to be drilled at the bottom of the drilled hole along the cutting edges as the drill bit rotates (in the counterclockwise direction as seen in FIGS. 4A to 4C). At the same time, a core is cut out to project upward from the bottom of the hole. As the drill bit further rotates in the counterclockwise direction, the cuttings are forced in the direction substantially perpendicular to the cutting edges at every point along the cutting edges, and a part of the cuttings are rubbed onto the core to fat the core. Some of the photographs we have taken during our experiments clearly show a situation that the core as produced has a diameter smaller than the width of the slot 10 and the space between the outer surface of the core and one of the walls defining the slot is filled with cuttings. When the innermost points 11 and 12 are diametrically opposed as in the prior art drill bit, i.e., when there are diametrically opposed parallel walls, the core gets trapped therebetween as it gets fatter. On the other hand, when the innermost points 11 and 12 are not diametrically opposed to each other, i.e., when there are no diametrically opposed parallel walls, the core cannot get trapped therebetween until it is substantially fatted. However, the core is broken before it is sufficiently fatted. This may be the reason why clogging of the core in the slot occurs less frequently in the drill bit of the present invention than in the prior art drill bit and at the same time, why the core formed in the drill bit of the present invention is thicker than that formed in the prior art drill bit.

Though the description has been made in conjunction with a twist drill in which cutting edge pieces are brazed to the drill body, the present invention can be applied to solid type tools in which the cutting edges are formed integrally with the tool body and to various drilling tools other than the twist drill.

We claim:
1. A drill bit comprising a drill body and a pair of cutting edges provided on one end of the drill body, wherein said pair of cutting edges are substantially radially opposed to one another across the axis of rotation of the drill bit, said cutting edges being spaced apart from one another to form a gap therebetween about the axis of rotation of said drill bit and to prevent core formation and deposition at the bottom of a hole being drilled, said cutting edges being configured such that line segments connecting innermost points of the cutting edges and the axis of rotation of said drill bit form an angle not larger than about 160°.
2. A drill bit as defined in claim 1 wherein said angle is not larger than 153°.

3. A drill bit a defined in claim 2, wherein the distance between the axis of rotation and the respective innermost points are different from each other.

4. A drill bit as defined in claim 1, wherein the distance between the axis of rotation and the respective innermost points are different from each other.

5. A drill bit comprising a drill body and two cutting edges provided on one end of the drill body, wherein said cutting edges are substantially radially opposed to one another across the axis of rotation of the drill bit, said cutting edges being spaced apart from one another such that a gap is formed about the axis of rotation of said drill bit, the innermost points of the cutting edges of the drill being spaced differing distances from the axis of rotation of said drill bit, and said cutting edges being shaped such that line segments connecting the innermost points of the cutting edges and the axis of rotation of said drill bit form an angle not larger than about 160°.

6. The drill of claim 5, wherein said angle is not larger than about 153°.

* * * * *